(12) United States Patent
Shapiro

(10) Patent No.: US 11,527,798 B2
(45) Date of Patent: Dec. 13, 2022

(54) BATTERY MOUNTING MECHANISM

(71) Applicant: BAE Systems Information and Electronic Systems Integration Inc., Nashua, NH (US)

(72) Inventor: Gary M. Shapiro, Wakefield, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 9 days.

(21) Appl. No.: 17/002,927

(22) Filed: Aug. 26, 2020

(65) Prior Publication Data

US 2022/0069267 A1 Mar. 3, 2022

(51) Int. Cl.
*B60K 1/04* (2019.01)
*H01M 50/20* (2021.01)

(52) U.S. Cl.
CPC .............. *H01M 50/20* (2021.01); *B60K 1/04* (2013.01); *B60K 2001/0494* (2013.01); *H01M 2220/20* (2013.01)

(58) Field of Classification Search
CPC . B60K 1/04; B60K 2001/0494; H01M 50/20; H01M 2220/20
See application file for complete search history.

(56) References Cited

U.S. PATENT DOCUMENTS

| | | | | |
|---|---|---|---|---|
| 4,152,492 A * | 5/1979 | McCartney | ......... | H01M 12/065 429/118 |
| 4,237,197 A * | 12/1980 | Hart | .................... | H01M 10/365 429/81 |
| 6,093,076 A * | 7/2000 | Street | ..................... | A63H 23/12 446/156 |
| 9,310,002 B2 * | 4/2016 | Chiproot | ................ | F16J 15/027 |
| 10,199,620 B2 * | 2/2019 | Romand | .............. | H01M 50/20 |
| 10,770,713 B2 * | 9/2020 | Park | ....................... | H01M 50/46 |
| 10,773,780 B2 | 9/2020 | Smith et al. | | |
| 11,114,731 B2 * | 9/2021 | Sazarin | ............... | H01M 50/166 |
| 2007/0007397 A1 * | 1/2007 | Nelson | .................. | F16L 3/2235 248/68.1 |
| 2013/0288097 A1 * | 10/2013 | Kawatani | ................ | B60L 50/66 429/100 |
| 2017/0369137 A1 | 12/2017 | Smith et al. | | |
| 2018/0205051 A1 * | 7/2018 | Sakai | ..................... | H02J 7/0042 |
| 2019/0386258 A1 * | 12/2019 | Lai | ........................ | H01M 50/30 |
| 2020/0338943 A1 * | 10/2020 | Tran | ....................... | B63H 21/17 |
| 2020/0365932 A1 * | 11/2020 | Schaar | ............. | H01M 10/0525 |
| 2021/0356104 A1 * | 11/2021 | Thorne | ............... | F21V 21/0965 |

OTHER PUBLICATIONS

Cobb et al., V-Band Clamp, U.S. Appl. No. 17/184,834, filed Feb. 25, 2021.

\* cited by examiner

*Primary Examiner* — James A English
*Assistant Examiner* — James J Triggs
(74) *Attorney, Agent, or Firm* — Sand, Sebolt & Wernow LPA; Scott J. Asmus

(57) ABSTRACT

A battery mounting mechanism that allows for one or more battery assemblies to be mounted in various positions within a vehicle via a securely attached mounting assembly that may allow for quick and easy adjustment of the position of the battery assemblies while further preventing rotation of the battery assemblies. Further provided herein is a mechanism for connecting multiple battery assemblies into a single battery unit while still allowing these battery assemblies to take advantage of the battery mounting mechanism provided herein.

16 Claims, 15 Drawing Sheets

BATTERY MOUNTING MECHANISM

TECHNICAL FIELD

The present disclosure relates to a battery mounting mechanism that allows a battery assembly to be mounted at various positions within a structure. More particularly, in one example, the present disclosure relates to a battery mounting mechanism that may prevent battery rotation while allowing battery assembly to be mounted in various positions within the hull of a vessel or similar vehicle. Specifically, in another example, the present disclosure relates to a battery mounting mechanism that may allow for multiple battery assemblies to be connected and mounted in a movable position within the hull of a vessel or similar vehicle while preventing rotation of the battery assembly within the battery mounting mechanism.

BACKGROUND

Battery assemblies are devices which may contain or otherwise hold one or more battery cells while maintaining them in proper electrical connection with any neighboring battery cells and with the various components for which the batteries are to supply power. These battery assemblies may be found in multiple shapes, sizes and configurations depending on the specific implementation therefore. A common example of a basic battery assembly may be a battery carriage that may supply slots for multiple commercially available batteries and battery cells such as AA, AAA, C, D, Lithium-ion, Nickel-Cadmium, or the like, and may power common household items such as flashlights, radios, small appliances, or similar devices. More complex battery assemblies may larger and/or more complex battery cells and may be used to power anything that utilizes electrical power. One common and well-known example of such a device includes battery-powered vehicles, both manned and unmanned, as well as autonomous vehicles.

To supply sufficient power to larger devices, such as a vehicle, battery assemblies may be unwieldy, therefore the size and weight must be taken into account when developing and/or operating such devices. For example, in battery-powered vehicles such as an automobile, the size and weight of the battery assembly may dictate its placement to provide proper weight on multiple axles of the vehicle. Where a battery-operated device is a waterborne vehicle or watercraft, such as a boat or an underwater vehicle, the size and weight of the battery assembly may be further employed to provide proper ballasting to the vessel. Accordingly, the placement of the battery assembly, based on its size and weight, may cause a waterborne vessel to operate differently depending on the location of the battery assembly. For example, if the battery assembly is placed too far forward within the vessel, it may cause the vehicle to operate too low in the water and/or at a downward angle, thus affecting the performance of the waterborne vehicle. Similarly, if the weight is distributed too far to the rear, the vehicle may ride too high in the water and/or at the improper angle for ideal operation. Therefore, it is important for proper ballasting of a waterborne vehicle to place the battery assembly in the proper position to provide optimal ballast and operating conditions for that vehicle.

Current solutions to battery mounting in a waterborne vessel include providing a series of grooves cut and/or formed into the hull of the vessel and snap rings are utilized to hold the battery assemblies in place. These current designs can create weak sections in the hull and do not prevent the battery from rotating or shifting when the vehicle is in operation. Further, the current battery assemblies for watercraft are difficult to manipulate for installation and uninstallation of the battery assemblies, maintenance, and/or to adjust the battery assembly position to change the effect on the ballast of the watercraft.

SUMMARY

The present disclosure addresses these and other issues by providing a battery mounting mechanism that allows for one or more battery assemblies to be mounted in various positions within a vehicle via a securely attached mounting assembly that may allow for quick and easy adjustment of the position of the battery assemblies while further preventing rotation of the battery assemblies. Further provided herein is a mechanism for connecting multiple battery assemblies into a single battery unit while still allowing these battery assemblies to take advantage of the battery mounting mechanism provided herein.

In one aspect, an exemplary embodiment of the present disclosure may provide a battery mounting mechanism comprising: a mounting assembly having at least one longitudinal row of teeth extending into an interior of the mounting assembly; at least one battery section having at least one groove corresponding to the at least one longitudinal row of teeth for slidable engagement therewith; and a handle assembly operable to engage at least one tooth in the at least one longitudinal row of teeth to lock the at least one battery section in position within the mounting assembly. This exemplary embodiment or another exemplary embodiment may further provide wherein the at least one longitudinal row of teeth preve This exemplary embodiment or another exemplary embodiment may further provide wherein the handle assembly further comprises: a lock flange that is rotatable between an unlocked position wherein at least one notch defined in the lock flange is aligned with the at least one longitudinal row of teeth and operable to permit the at least one battery assembly to move to a plurality of longitudinal positions within the mounting assembly, and a locked position wherein the lock flange is engaged with at least one tooth of the in the at least one longitudinal row of teeth to prevent longitudinal movement of the at least one battery section within the mounting assembly. This exemplary embodiment or another exemplary embodiment may further provide a first battery section having at least one groove corresponding to the at least one longitudinal row of teeth for slidable engagement therewith and an end plate on a rear end of the first battery section; and a second battery section having at least one groove corresponding to the at least one longitudinal row of teeth for slidable engagement therewith and an end plate on a front end of the second battery section. This exemplary embodiment or another exemplary embodiment may further provide wherein the end plate on the first battery section is an opposing mirror image of the end plate on the second battery section, each end plate further comprising: a plurality of recesses; and a plurality of flanges that are operable to fit within the plurality of recesses on the opposing end plate to form a continuous groove around at least a portion of the two end plates. This exemplary embodiment or another exemplary embodiment may further provide a snap ring operable to engage the groove formed by the plurality of recesses and plurality of flanges on the end plates of the first and second battery sections. This exemplary embodiment or another exemplary embodiment may further provide wherein the mounting assembly further comprises: at least three longitudinal rows of teeth extending into the interior of the mounting assembly. This exemplary embodiment or another exemplary embodiment may further provide wherein the at least one battery section further comprises: at least three grooves corresponding to the at least one longitudinal row of teeth for slidable engagement therewith; and wherein the handle assembly is operable to engage at least one tooth in the at least one longitudinal row of teeth from each of the at least three longitudinal rows of teeth to lock the at least one battery section in position within the mounting assembly. This exemplary embodiment or another exemplary embodiment may further provide a longitudinal channel defined in the mounting assembly.

In another aspect, an exemplary embodiment of the present disclosure may provide a method of mounting a battery mechanism comprising: securing a mounting assembly having at least one longitudinal row of teeth extending into an interior of the mounting assembly within a device to be powered; inserting a battery assembly with at least one battery section having at least one groove corresponding to the at least one longitudinal row of teeth longitudinally into the mounting assembly; adjusting the longitudinal position of the battery assembly within the mounting assembly to a desired position; and engaging a lock flange of a handle assembly with at least one tooth in the at least one longitudinal row of teeth to lock the battery assembly in position within the mounting assembly. This exemplary embodiment or another exemplary embodiment may further provide disengaging the lock flange of the handle assembly from the at least one tooth; moving the battery assembly to a second longitudinal position within the mounting assembly; and engaging the lock flange of the handle assembly with at least another one tooth in the at least one longitudinal row of teeth to lock the battery assembly in the second position within the mounting assembly. This exemplary embodiment or another exemplary embodiment may further provide wherein the battery assembly further comprises: a first battery section having at least one groove corresponding to the at least one longitudinal row of teeth for slidable engagement therewith and an end plate on a rear end of the first battery section; and a second battery section having at least one groove corresponding to the at least one longitudinal row of teeth for slidable engagement therewith and an end plate on a front end of the second battery section. This exemplary embodiment or another exemplary embodiment may further provide wherein the end plate on the first battery section is an opposing mirror image of the end plate on the second battery section, each end plate further comprising: a plurality of recesses; and a plurality of flanges that are operable to fit within the plurality of recesses on the opposing end plate to form a continuous groove around at least a portion of the two end plates. This exemplary embodiment or another exemplary embodiment may further provide wherein the battery assembly further comprises: a snap ring operable to engage the groove formed by the plurality of recesses and plurality of flanges on the end plates of the first and second battery sections. This exemplary embodiment or another exemplary embodiment may further provide wherein the device to be powered is a waterborne vehicle and the desired position is determined as a proper ballast position for the battery assembly, the method further comprising: moving the battery assembly to a second longitudinal position within the mounting assembly to adjust the ballast of the waterborne vehicle. This exemplary embodiment or another exemplary embodiment may further provide wherein the lock flange is rotatable between an unlocked position wherein at least one notch defined in the lock flange is aligned with the at least one longitudinal row of teeth, and a locked position wherein the lock flange is engaged with at least one tooth in the at least one longitudinal row of teeth to prevent longitudinal movement of the at least one battery section within the mounting assembly.

In yet another aspect, an exemplary embodiment of the present disclosure may provide a method of connecting adjacent battery sections in a battery assembly comprising: positioning a first battery section having a rear end plate on one end thereof adjacent to a second battery section having a front end plate on one end thereof so that the rear end plate on the first battery section and the front end plate on the second battery section are facing each other; aligning a plurality of recesses defined in the rear end plate with a plurality of flanges on the front end plate; aligning a plurality of recesses defined in the front end plate with a plurality of flanges on the rear end plate; mating the rear end plate on the first battery section to the front end plate on the second battery section to form a continuous groove from the opposing flanges from each of the end plates; and securing the rear end plate on the first battery section to the front end plate on the second battery section with a snap ring operable to engage the groove. This exemplary embodiment or another exemplary embodiment may further provide wherein the rear end plate on the first battery section is a mirror image of the front end plate on the second battery section. This exemplary embodiment or another exemplary embodiment may further provide connecting the second battery section to a third battery section by engaging a rear end plate on the second battery section and a front end plate on the third battery section to form a second groove; and securing the rear end plate on the second battery section to the front end plate on the second battery section with second snap ring operable to engage the second groove. This exemplary embodiment or another exemplary embodiment may further provide wherein the first battery section further comprises a handle assembly on a front end thereof operable to lock the battery assembly in position within a mounting assembly to prevent movement thereof.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
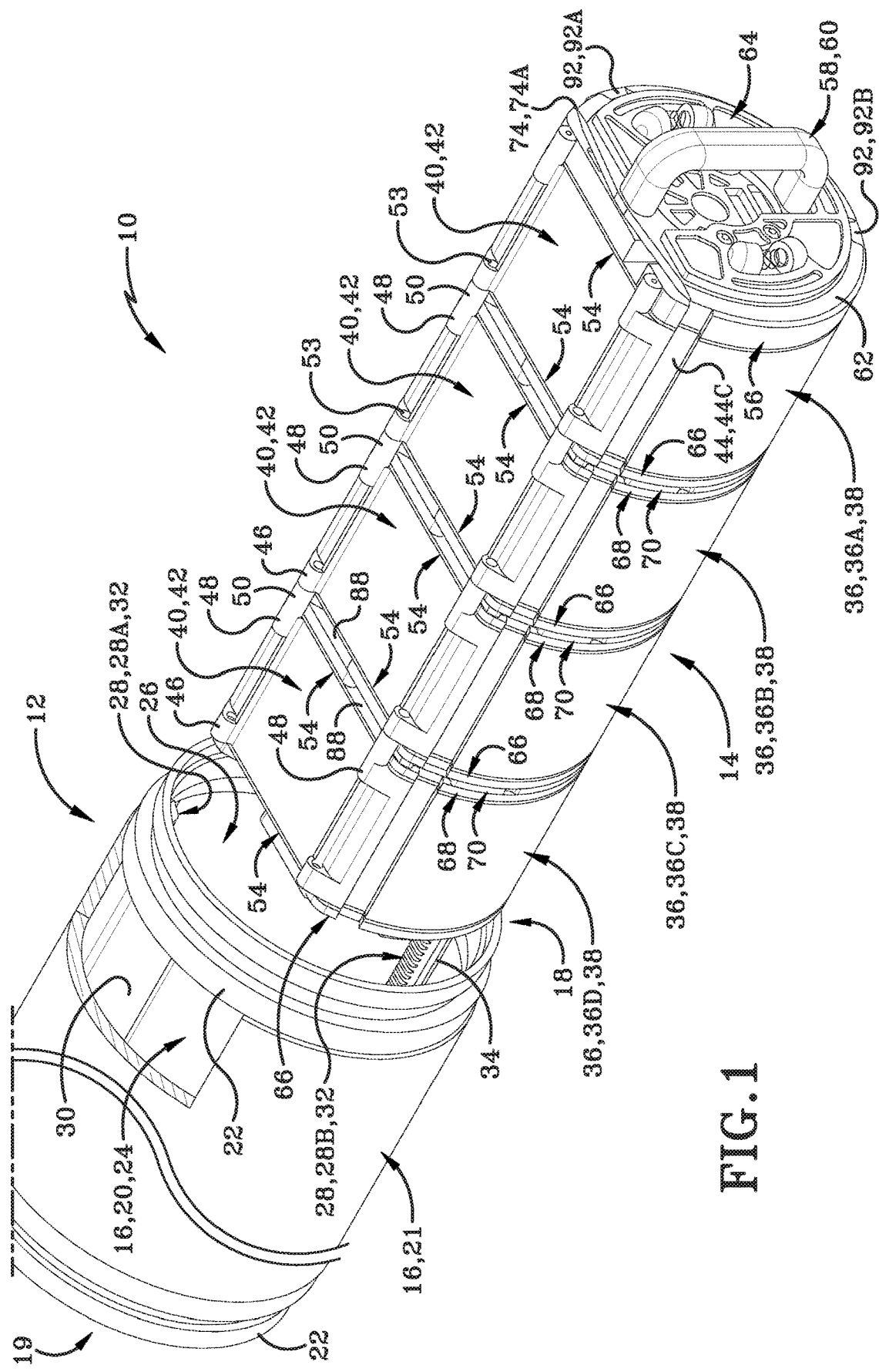
FIG. 1 is a front perspective view of a battery mounting mechanism according to one aspect of the present disclosure.
Figure 2:
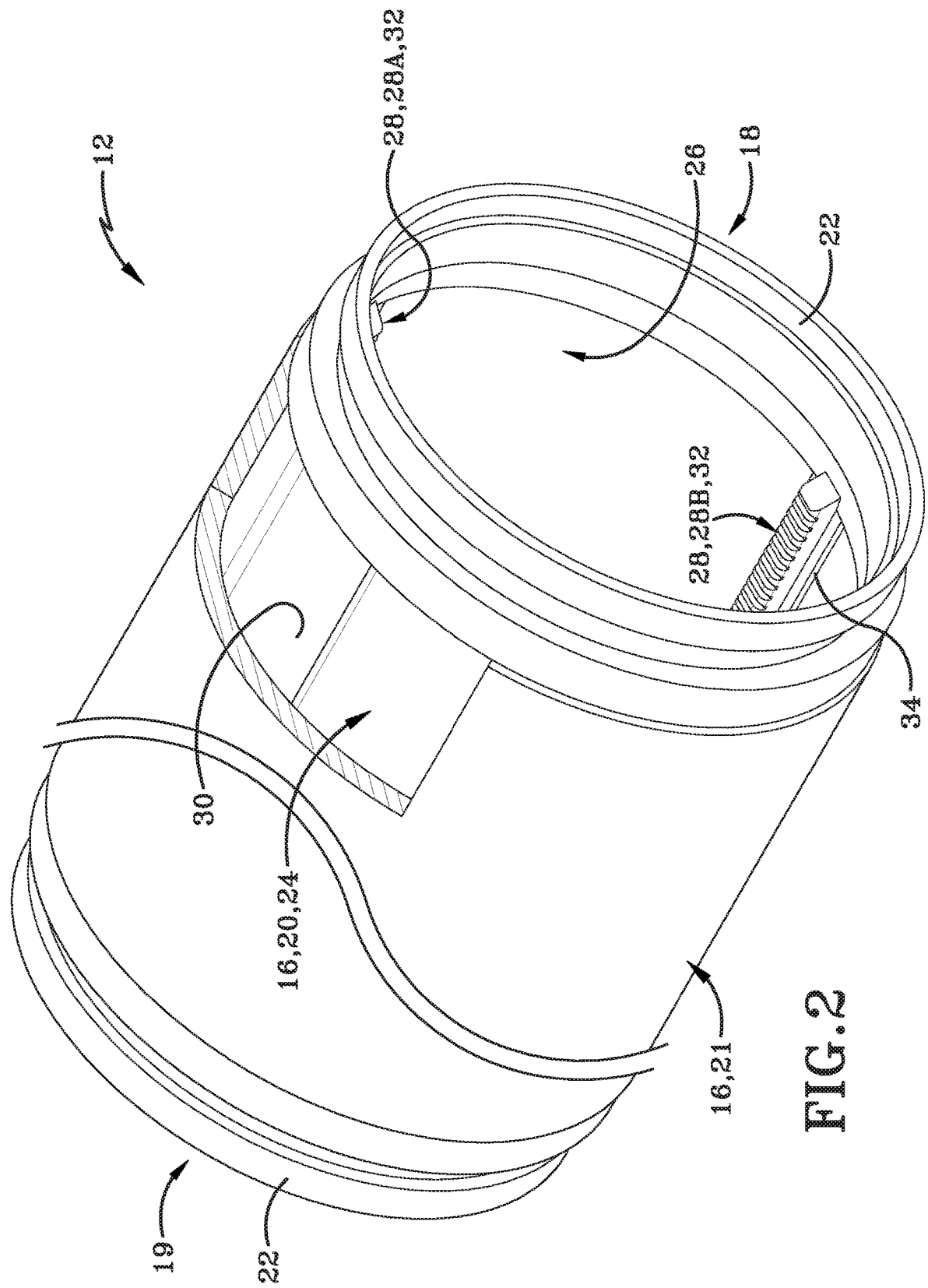
FIG. 2 is a front perspective view of a mounting assembly for a battery mounting mechanism according to one aspect of the present disclosure.
Figure 3:
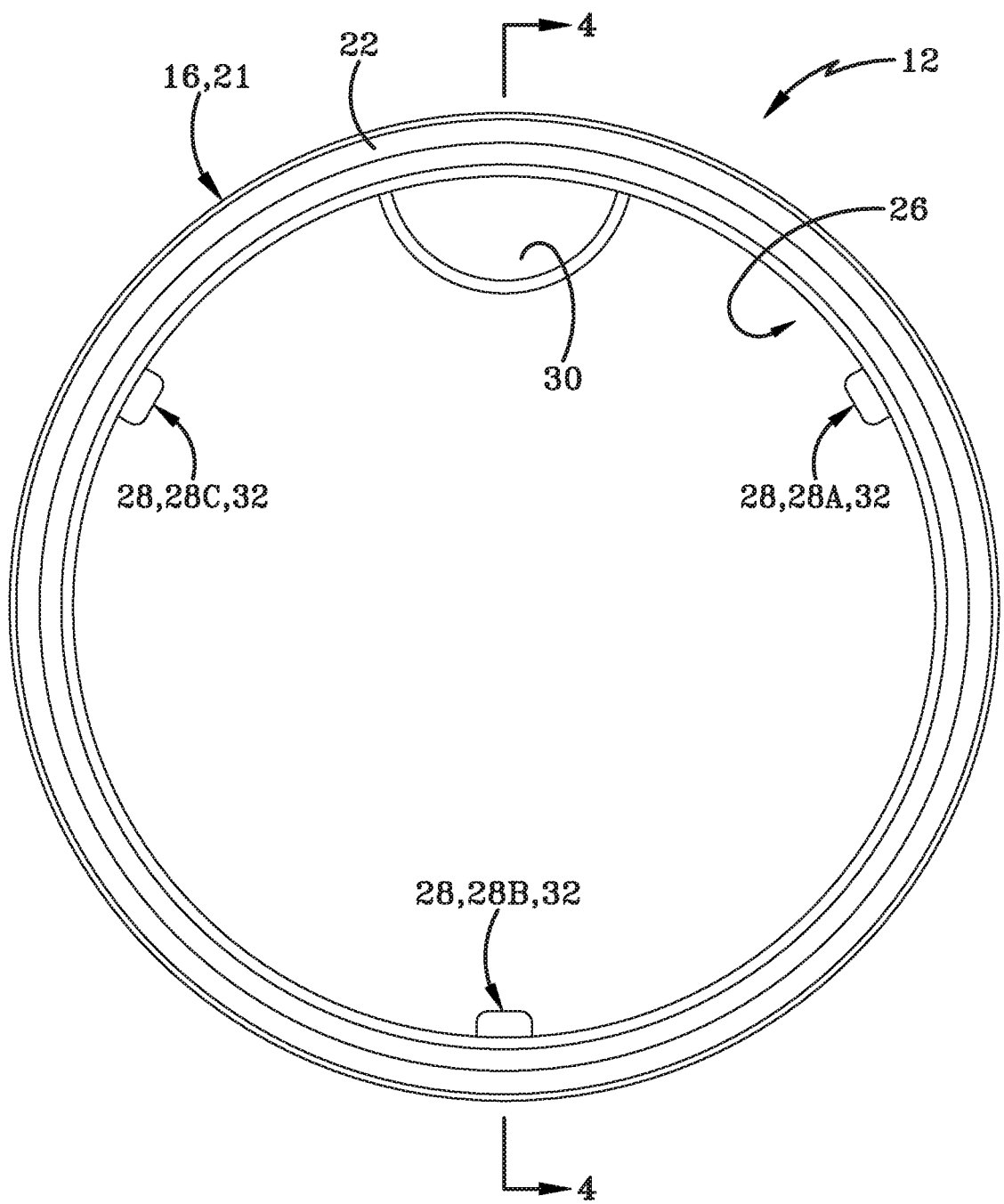
FIG. 3 is a front elevation plan view of a mounting assembly for a battery mounting mechanism according to one aspect of the present disclosure.

With reference to FIG. 1, a battery mounting mechanism is shown and generally indicated at reference 10. Battery mounting mechanism 10 may include a mounting assembly 12 and a battery assembly 14.

With reference to FIGS. 1-4, mounting assembly 12 may include a body 16 having a first end 18 defining a first opening and a second end 19 defining a second opening opposite therefrom and defining a longitudinal direction therebetween. The first and second ends 18, 19 may be substantially identical providing mounting assembly 12 with a symmetrical and uniform appearance and structure. Mounting assembly 12 may have an indiscriminate longitudinal length as determined by the desired implementation and installation parameters. Body 16 of mounting assembly 12 may further include an inner sleeve 20 and an outer sleeve 21. Outer sleeve 21 may serve as a protective cover for inner sleeve 20 and the battery assembly 14 and components contained therein. Accordingly, it will be understood that references to mounting assembly 12 and/or assembly 12, may include both inner and outer sleeves 20 and 21, while references to the exterior 24 and interior 26 of assembly 12 are understood to refer to the exterior 24 and interior 26 of inner sleeve 20, unless explicitly stated otherwise.

Each of first and second end 18, 19 of mounting assembly 12 may have a mounting flange 22 or similar structure which may allow for mounting assembly 12 to be mounted to a structure, such as a hull of a waterborne vessel or watercraft, or to any other suitable structure. Mounting flange 22 may connect to a structure via any suitable attachment mechanism, including mounting brackets, snap rings, screws, bolts, or the like. According to one aspect, first and second ends 18, 19 of mounting assembly 12 may be sealed or otherwise closed with a separate cap or lid (not shown) that may further attach to mounting flange 22 or to mounting assembly 12 body 16.

Figure 4:
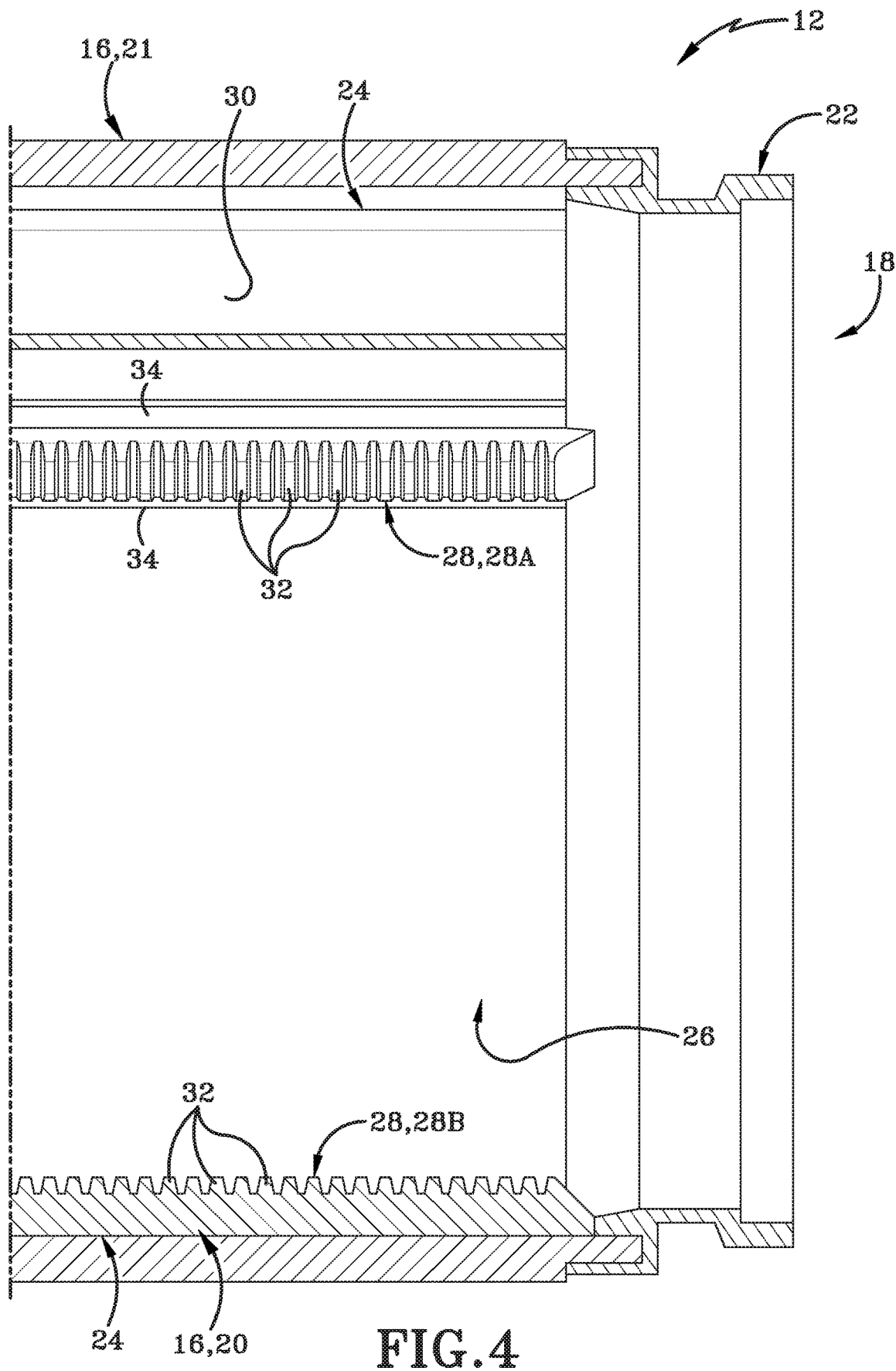
FIG. 4 is a side elevation cross-section view of a mounting assembly for a battery mounting mechanism taken along the line indicated in FIG. 3, according to one aspect of the present disclosure.

Inner sleeve 20 may be a generally hollow cylindrical tube and may further have an exterior 24 and an interior 26, which may define the interior space of inner sleeve 20. Inner sleeve 20 may further include at least one set of projections 28 that may extend into the interior 26 of inner sleeve 20. These projections will here and after be referred to as rows 28 of teeth 32 and may consist of a plurality of teeth 32 arranged into one or more longitudinally-extending rows 28, which may be spaced about the interior 26 of mounting assembly 12, as discussed further herein. It will be understood that references to rows 28 herein include the associated plurality of teeth 32 within that row 28, unless expressly stated otherwise. According to one aspect, three rows 28A, 28B, and/or 28C (as depicted throughout the figures) may be provided. Further according to this aspect, the rows 28A, 28B, and 28C may be spaced evenly about the interior 26 of inner sleeve 20 such that a first row 28A may be positioned at approximated "2 o'clock", with the second and third rows 28B, and 28C, positioned at "6 o'clock" and "10 o'clock" respectively. According to another aspect, any suitable number of rows 28 may be provided and spaced within the interior 26 of inner sleeve 20 as dictated by the desired implementation. The plurality of teeth 32 in each row 28 may be generally square or rectangular-shaped and substantially identically sized. These teeth 32 may generally be of uniform thickness and each individual tooth 32 may be separated in the longitudinal direction from each neighboring tooth 32, as best seen in FIG. 4, to define slots therebetween. The rows 28 may further include a contoured or stepped portion 34 which may interact with the battery assembly 14 to prevent rotation of battery assembly 14 when installed, as discussed further below. Rows 28 may extend the entire longitudinal length of inner sleeve 20, terminating at or near the mounting flanges 22 disposed at each of first end and second end 18 and 19 of mounting assembly 12. The ends of rows 28 may be tapered, angled, sloped (as shown), or may be of any other suitable profile to facilitation interaction with battery assembly 14, as discussed herein.

Inner sleeve 20 may further include a longitudinal channel 30 defined in the exterior surface 24 thereof such that longitudinal channel 30 may extend partially into the interior 26 of inner sleeve 20. Longitudinal channel 30 may extend the entire longitudinal length of inner sleeve 20, terminating at or near the mounting flanges 22 disposed at each of first and second ends 18 and 19 of mounting assembly 12. Channel 30 may permit the passage of cables or other components therethrough, as discussed below.

According to one aspect, mounting assembly 12, or more particularly body 16 of mounting assembly 12, may be formed of separate sections, which may be joined together to form a complete body 16. According to this aspect, these body 16 sections may be removably attached through any suitable means such as screws, bolts, clips, or the like, or alternatively may be more permanently affixed utilizing rivets, adhesives, welding, or any other suitable fastening means. According to another aspect, mounting assembly 12 may be formed as a single unit. Mounting assembly 12 may be formed with any suitable manufacturing technique including extrusion, 3D printing, stamping, rolling rotationally blow molded or the like and may be formed of any suitable material including plastics, metals, or the like. According to one aspect, where battery mounting mechanism 10 is anticipated to be installed in a waterborne vessel that may be utilized in bodies of salt water, it may be beneficial to form mounting assembly 12 and the components thereof of plastics or of non-corrosive materials, such as stainless steel, or the like.

According to one aspect, inner and outer sleeves 20 and 21 may be omitted and the longitudinal rows 28 of teeth 32 may be provided on or as one or more rails (not shown) that may permit slideable engagement with battery assembly 14, as discussed further herein. According to this aspect, longitudinal channel 30 may be omitted, or may alternatively be provided as a separate component, as desired. Further according to this aspect, these rails and/or longitudinal channel 30 as a separate aspect may be supported by a series of mounting rings or other mounting components as necessary and as dictated by the desired implementation. While the mounting assembly 12 is presented and discussed primarily herein as a tube having inner and outer sleeves 20 and 21, it will be understood that other embodiments of mounting assemblies may be provided, such as the non-limiting example of rails above, without deviating from the scope herein.

Mounting assembly 12 may be sized according to the desired installation and implementation thereof, thus the interior and exterior diameters of mounting assembly 12 may vary depending on the specific installation parameters. Similarly, mounting assembly 12 may be of indiscriminate length, as mentioned previously, provided it is of suitable length to fully enclose battery assembly 14. Although not shown in the figures, it is understood that mounting assembly 12 may further include any necessary mounting hardware brackets, clips, or the like suitable to affix mounting assembly 12 and/or mounting flanges 22 to an associated surface such as the interior of a vehicle or vessel, or to any other suitable mounting surface. It will be further understood that the type, configuration, and/or location of these mounting components may also vary depending on the specifics of the desired implementation and installation parameters.

Figure 5:
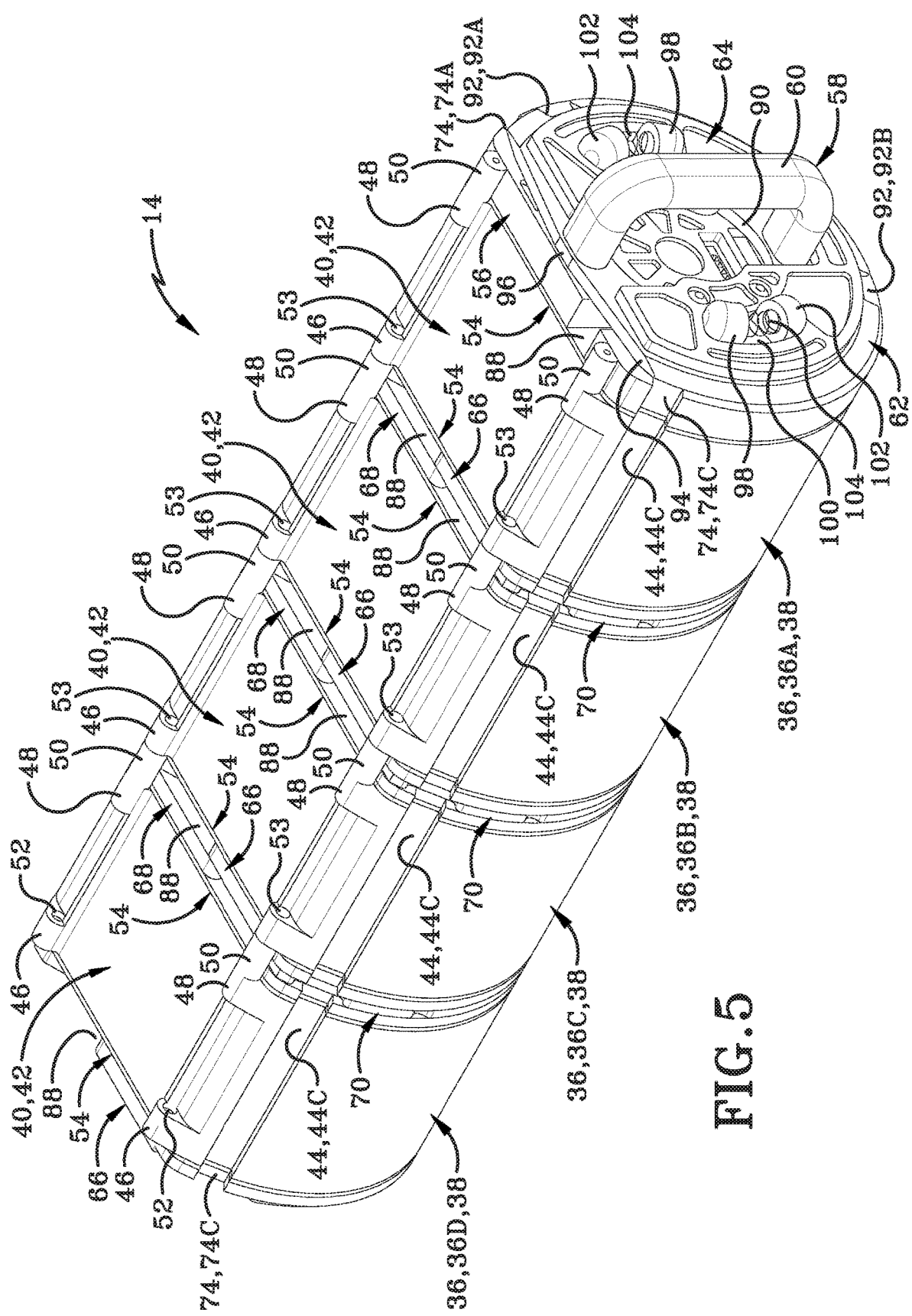
FIG. 5 is a front perspective view of a battery assembly of a battery mounting mechanism according to one aspect of the present disclosure.

With reference to FIG. 5, battery assembly 14 may include one or more battery sections 36 which may be substantially similar or substantially identical relative to the other battery sections 36, except as specifically described herein. As depicted in FIG. 5, battery assembly 14 is shown having four battery sections, namely, sections 36A, 36B, 36C and 36D; however, it will be understood that battery assembly 14 may include any suitable number of battery sections (provided at least one is included), depending on the desired implementation thereof.

With reference to FIGS. 5-10, each battery section 36 of battery assembly 14 may have a battery housing 38 having a body 40 which may be generally cylindrical and sized to fit within the interior 26 of mounting assembly 12 for slidable engagement therewith, as discussed further herein. According to another aspect, battery housing 38 may be any suitable shape optimal to interact with longitudinal rows 28 of teeth 32 and configured to hold or otherwise contain a battery or series of batteries therein, as discussed further below.

Body 40 of battery housing 38 may have a flattened or truncated top 42 which may, in conjunction with inner sleeve 20, create or otherwise define an open area (best seen in FIGS. 13 and 14 at reference 110) which may allow passage of battery cables or the like therethrough. Battery housing 38 may include a series of longitudinally-extending grooves 44 which may correspond with the longitudinal rows of teeth 28 within mounting assembly 12 for slidable engagement therewith. According to one aspect where mounting assembly 12 includes three evenly-spaced rows of teeth 28 (i.e. rows 28A, 28B, and 28C), battery housing 38 may likewise have three grooves 44A, 44B, and 44C corresponding therewith. Adjacent the top 42 of body 40 may be one or more projections, such as first projection 46 and/or second projection 48 which may include an extension or arm 50 and may further define a screw aperture 52, which may permit adjacent battery sections 36 to be secured together, if desired or necessary according to the desired implementation. The attachment of adjacent battery sections 36 is discussed further below.

Each battery section 36 may have a PC board (PCB) 54 disposed at each longitudinal end thereof. These PCBs may be standard control boards having standard control board components relative to the operation and/or maintenance of a battery assembly such as battery assembly 14. According to one non-limiting example, PCBs 54 may include positive and negative battery contacts, as well as charging and discharging circuitry, battery health monitoring circuitry, or any other suitable and desired circuitry and components as dictated by the desired operation and implementation of battery mounting mechanism 10. PCBs 54 may include notches 74 which may correspond and align with grooves 44 in battery housing 38, as discussed below.

It will be understood that battery assembly 14 and/or battery sections 36 may be reversible in that either end may be considered a forward or rearward end; however, as depicted and used herein, a forward end of battery assembly may be the end having a PCB cover 56 and handle assembly 58 disposed thereon. As shown in FIG. 5, the forward end is therefore understood to be the end to the right of the figure and the rearward end is longitudinally opposite therefrom.

Figure 6:
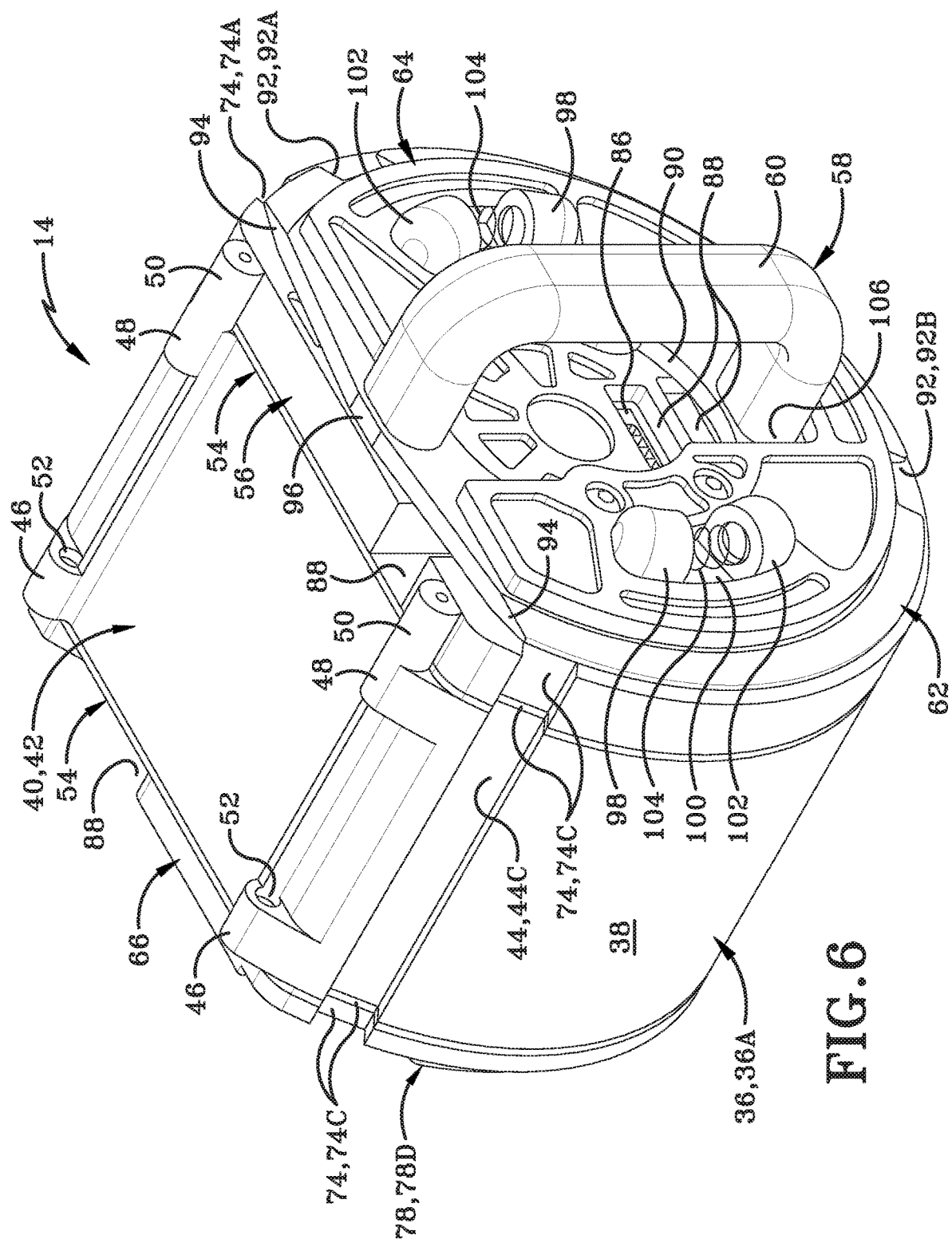
FIG. 6 is a front perspective view of a first battery section of a battery assembly of a battery mounting mechanism according to one aspect of the present disclosure.
Figure 7:
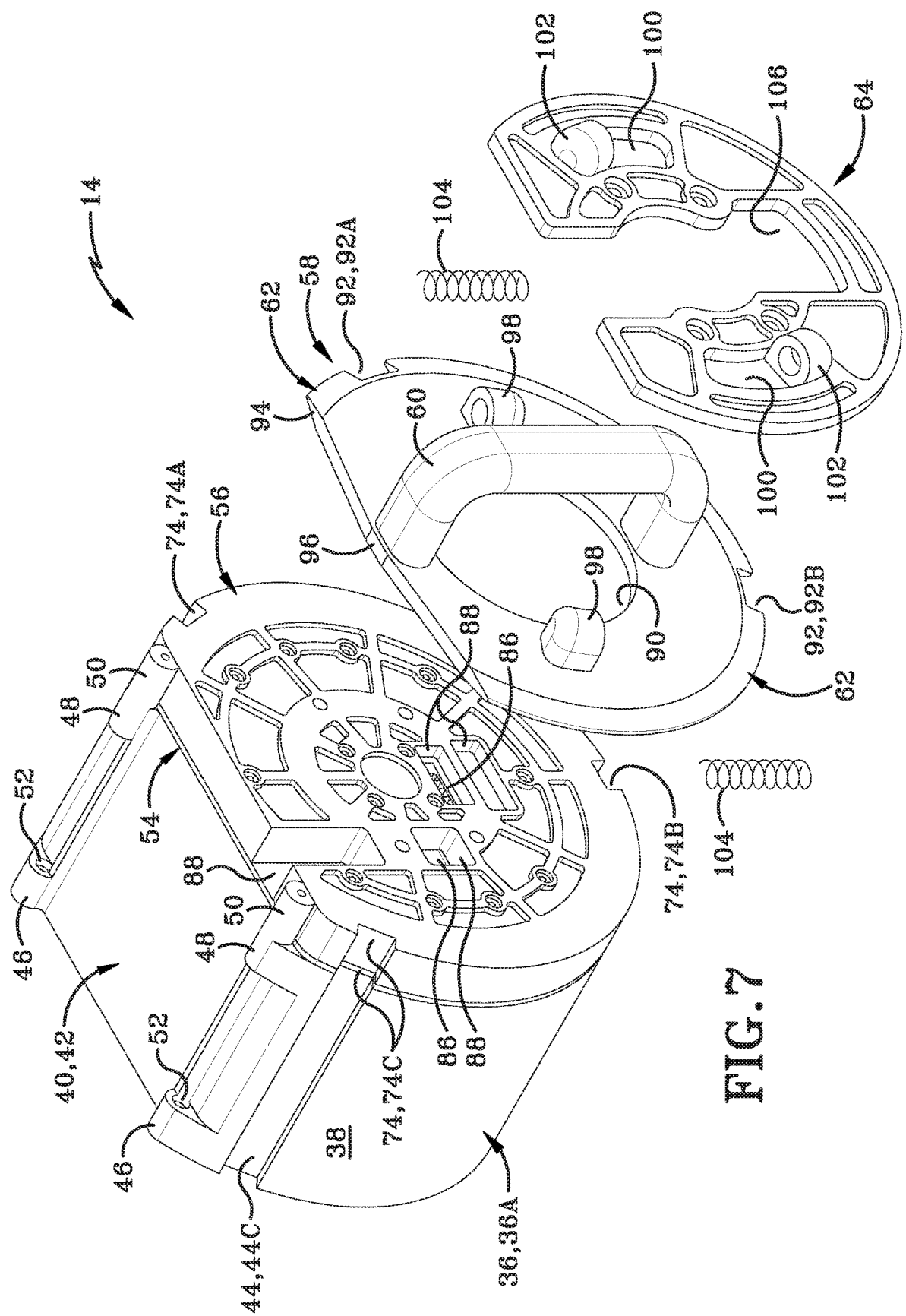
FIG. 7 is a front perspective exploded view of the first battery section from FIG. 6 according to one aspect of the present disclosure.

With reference to FIGS. 6 and 7, first section 36A, defined as the battery section 36 which includes PCB cover 56 and handle assembly 58, is shown in more detail. As seen therein, PCB cover 56 may be secured to one end of first battery section 36A and may be configured to cover and protect the PCB 54 on that side of first battery section 36A while allowing for operable engagement with handle assembly 58. The connection of PCB cover 56 may then define the forward end of first battery section 36A and of battery assembly 14 as a whole. The PCB cover 56 may be formed of any suitable material including plastics, metals, or the like and may further include notches 74 which may align with grooves 44 in battery housing 38 and with notches 74 in PCBs 54. The handle assembly 58 may be operably attached to PCB cover 54 and is discussed in detail below. Battery section 36A may also include a rear end plate 66 on the rearward side thereof, opposite the PCB cover 56 and handle assembly 58.

Figure 8:
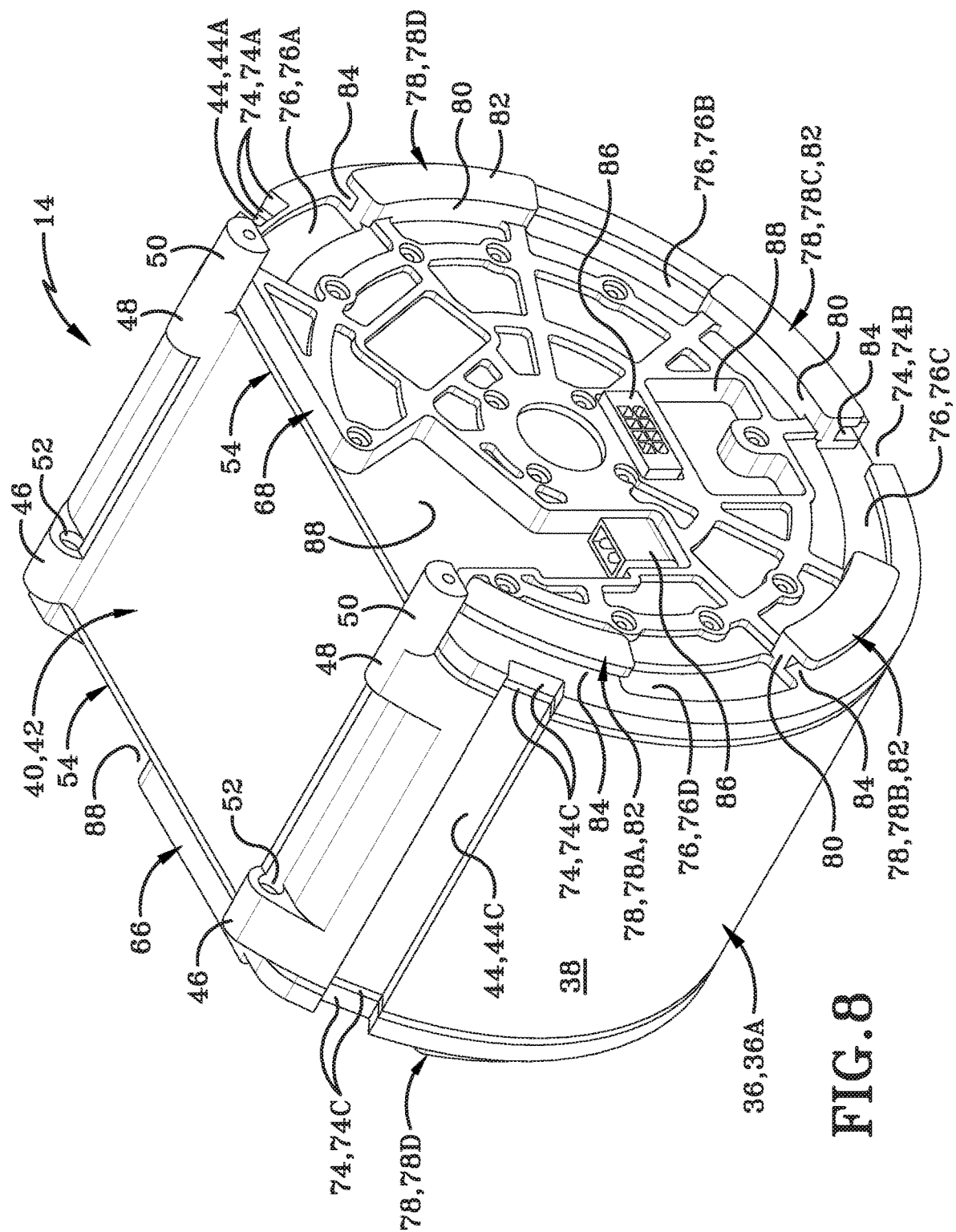
FIG. 8 is a front perspective view of a second battery section of a battery assembly of a battery mounting mechanism according to one aspect of the present disclosure.
Figure 9:
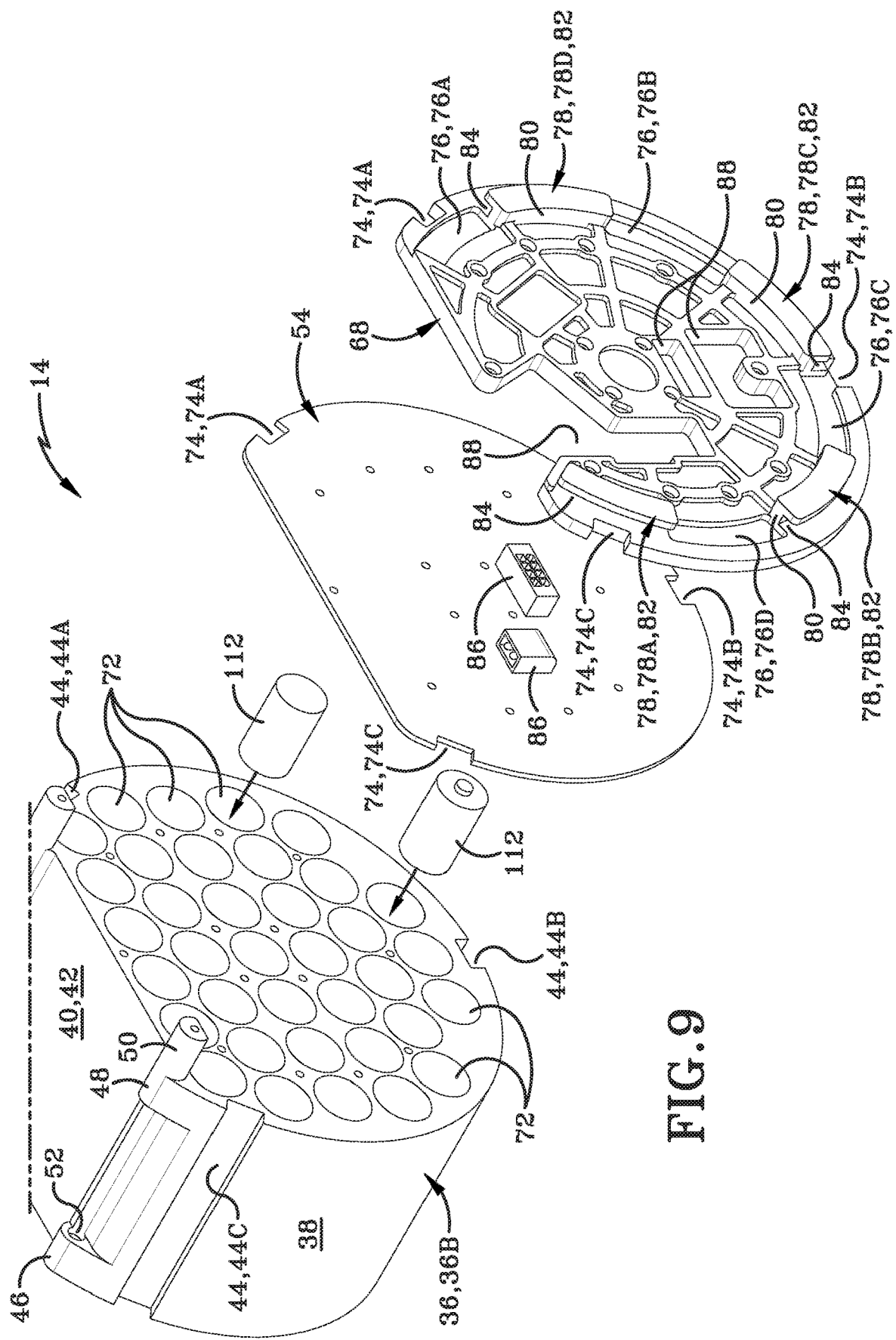
FIG. 9 is a front perspective exploded view of the second battery section from FIG. 8 according to one aspect of the present disclosure.

With reference to FIGS. 8 and 9, a second battery section 36 (as representative section 36B) is shown. Other than first battery section 36A, all other battery sections 36 may be substantially similar or identical. Therefore, it will be understood that subsequent battery sections 36 (such as sections 36C and 36D) may have the same features and components as second section 36B and references to second battery section 36B herein are therefore understood to refer to all battery sections 36, other than first battery section 36A, unless explicitly stated otherwise. It will further be understood that references to battery sections 36 may generally apply to all battery sections 36 (including first section 36A), unless explicitly stated otherwise. The main difference between first battery section 36A and all other battery sections 36 is that first battery section 36A is understood to include the PCB cover 56 and handle assembly 58, while other sections 36 do not. Specifically, second battery section 36B may include front end plate 68 on the forward end thereof, in lieu of PCB cover 56 and handle assembly 58. Second battery section 36B may have a rear end plate 66 on the rearward side, which may be substantially similar or identical to rear end plate 66 on first section 36A.

As used herein, it will therefore be understood that rear end plates 66 may be connected to or disposed on the battery sections 36 on the side opposite from handle assembly 58 and/or facing away therefrom. Put another way, when assembled as shown in FIG. 5 with the front end of battery assembly 14 to the right of the figure and the rear end to the left of FIG. 5, the rear end plates 66 may be attached to battery sections 36 facing the left or rear-end of battery assembly 14. Similarly, front end plates 68 may be affixed or otherwise attached to battery sections 36 and may face the right towards the front-end of battery assembly 14. As they are defined by their placement and orientation within battery assembly 14, it will be therefore understood that rear end plates 66 and front end plates 68 may be substantially similar or identical but for that placement and orientation. According to one aspect, rear end plates 66 and front end plates 68 may be mirror images. The structure of rear end plates 66 and front end plates 68 is discussed further below.

Figure 10:
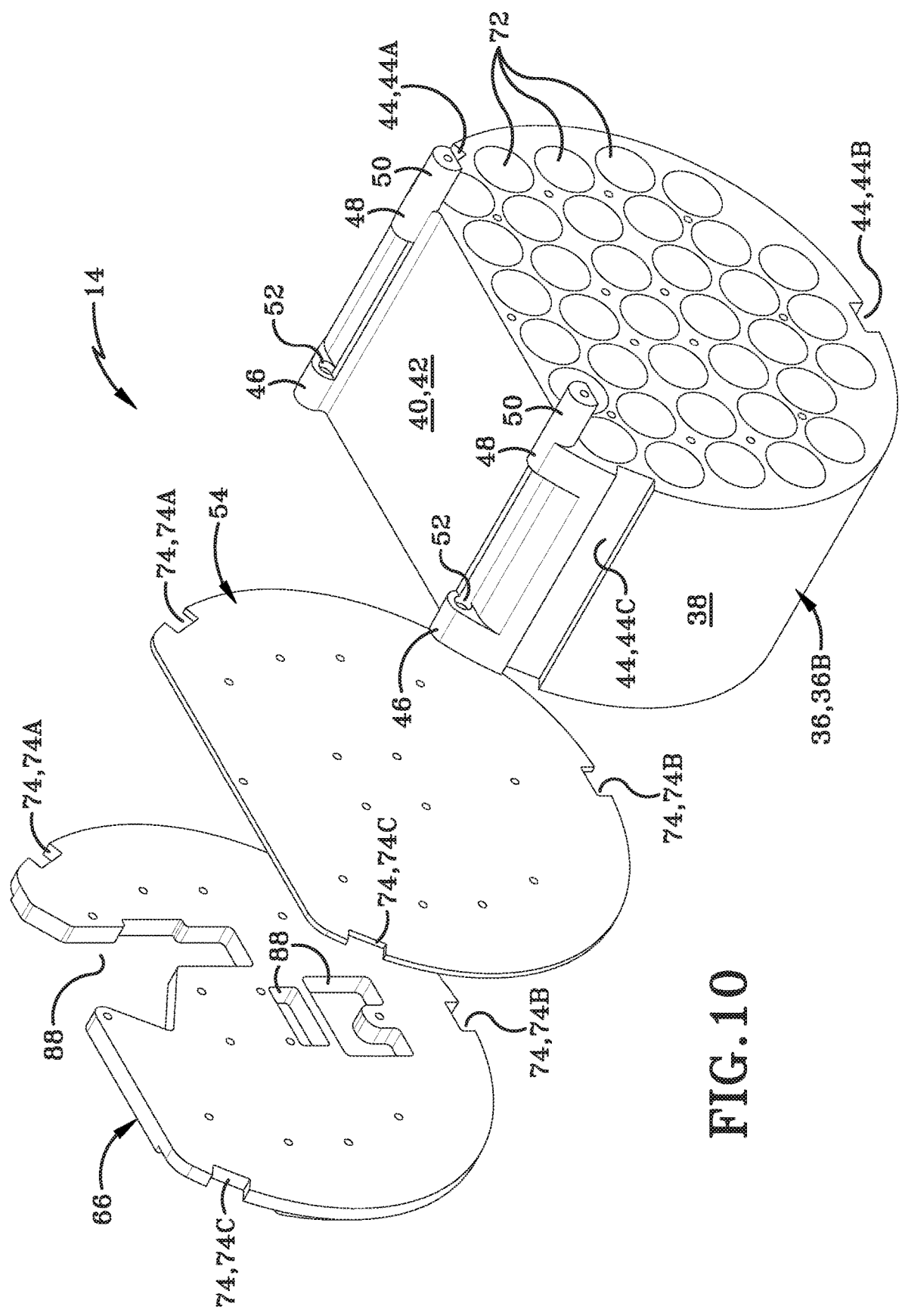
FIG. 10 is a partial rear perspective exploded view of the second battery section from FIG. 8 according to one aspect of the present disclosure.

With continued reference to FIGS. 5-10, but with particular reference to FIGS. 9 and 10, battery sections 36 of battery assembly 14 may further include one or more battery tubes 72 which may accept or receive a battery, such as battery 112 (best seen in FIG. 9), therein. Battery tubes may be numbered and sized according to the desired implementation to accept any suitable size and type of battery. According to one aspect, battery tubes 72 may be sized to accept standard sized batteries, such as AA, AAA, C, or D batteries. According to another aspect, battery tubes 72 may be sized to accept more than one size of battery. According to yet another aspect, battery tubes may be numbered and sized to accept any standard or non-standard battery size, including rechargeable, Lithium-ion, Nickel-Cadmium, or any other battery type and configuration as dictated by the desired implementation and the required power output of battery assembly 14.

Figure 11:
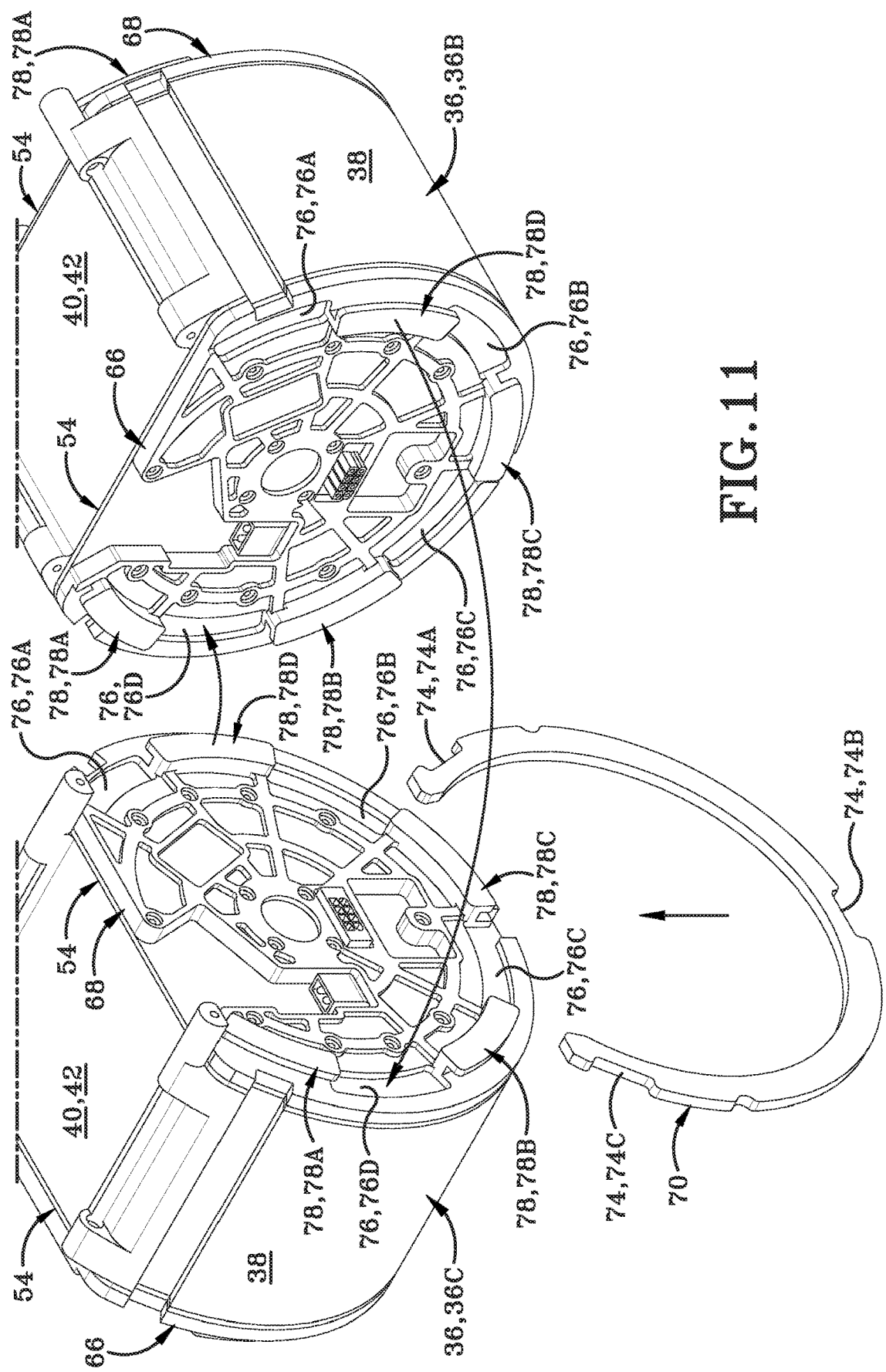
FIG. 11 is a front perspective operational view of two adjoining battery sections of a battery assembly being assembled according to one aspect of the present disclosure.
Figure 12:
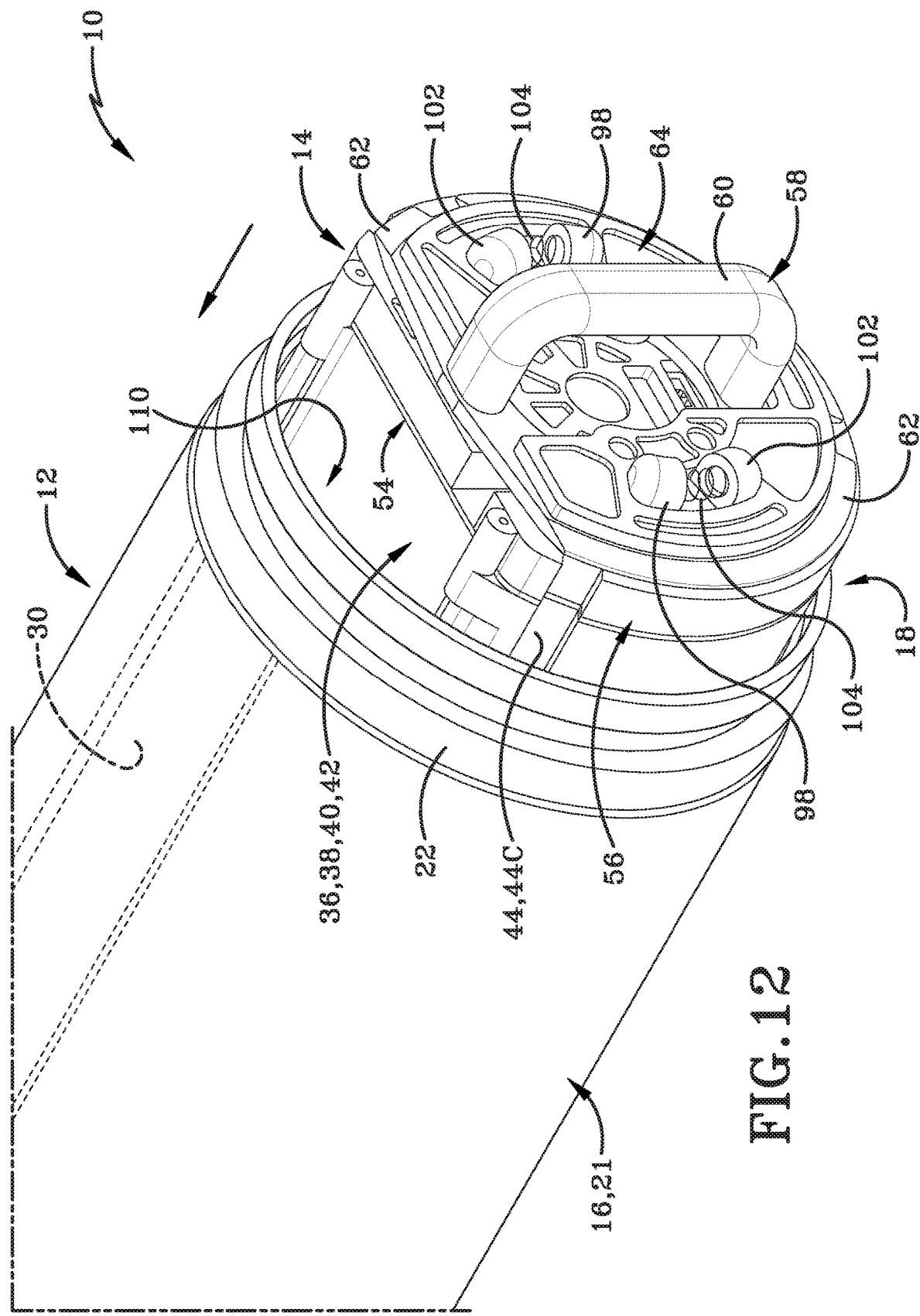
FIG. 12 is a front perspective operational view of a battery mounting mechanism according to one aspect of the present disclosure.

With reference to FIGS. 8, 9, and 11, end plates 66 and 68 are shown and will be discussed in more detail. It will again be understood that the main difference between rear and front end plates 66 and 68 may be their orientation and position within battery assembly 14. End plates 66 and 68 may include notches 74 which may again align with grooves 44 in battery assembly 14 when fully assembled as to facilitate slidable engagement of battery assembly 14 within mounting assembly 12. End plates 66 and 68 may further include a series of alternating recesses 76 and flanges 78, which may interact (as discussed further below) to provide an engagement surface (e.g. groove 84) for snap ring 70. Recesses 76 may be depressions formed or defined in end plates 66 and 68, and may be sized and shaped to fit a portion of flanges 78 therein when adjacent end plates 66 and 68 are connected, as discussed with reference to the connection between adjacent battery sections 36 below.

Flanges 78 may have a generally inverted L-shape in that they may include a riser portion 80 extending outwardly from the end plates 66 and 68, and a shelf portion 82 that may extend perpendicularly from the riser portion 80 and towards the outermost edge of end plates 66 and 68. According to one aspect, and as depicted in FIGS. 8, 9, and 11, each rear or front end plate 66 or 68 may include four recesses 76 and flanges 78 which may correspond to the recesses 76 and flanges 78 on an opposing and mirror imaged rear end plate 66 and 68.

As best seen in FIG. 11, the recesses 76 may be numbered starting with the upper right and proceeding in a clockwise fashion as 76A, 76B, 76C, and 76D while the flanges may be numbered and referred to starting with the upper left and proceeding in a counter-clockwise fashion as 78A, 78B, 78C and 78D. Thus, when mirrored and adjacent end plates 66 and 68 are connected, the interaction may be such that the shelf portion 82 of flange 78A may rest within recess 76A of the opposing end plate 66 or 68. Similarly, flange 78B may interact with recess 76B and so forth, thus providing a snug engagement between adjacent end plates 66 and 68 with each flange 78 interacting with the associated recess 76. When so configured and engaged, the alignment of flanges 78 will define a continuous groove 84 that may extend the majority of the circumference of end plates 66 and 68 which may allow for engagement with snap ring 70 as discussed below.

End plates 66 and 68 may further include a series of cutouts 88 which may allow for clearance of relevant components on PCB 54 such as fuses, transistors, resistors, or other suitable PCB 54 elements. According to one example, one such cutout 88 may allow for a connector 86 (best seen in FIG. 9) or the like which may facilitate electrical connection between adjoining battery sections 36, and/or with the device for which battery assembly 14 is to provide power, as discussed further below. According to this aspect, connector 86 may extend from the PCB 54 with one side being a male-type connector with the opposing connector being a female-type connector for proper engagement therebetween. According to another aspect, any suitable connector type may be used to electrically connect adjoining battery sections 36.

End plates 66 and 68 may be formed or any suitable material including plastics, metals, or the like and may include further cutouts, indentations, or apertures as dictated by the desired implementation to reduce weight, size or to facilitate mounting or attachment thereof to the housing 38 of battery sections 36.

With reference to FIG. 11, snap rings 70 may be semi-circular or have an open configuration to allow slidable engagement with groove 84 formed from flanges 78 on end plates 66 and 68 when they are engaged. Snap rings 70 may be formed of any suitable material including plastics, metal, or the like and may include a series of notches 74 which may again align and correspond with grooves 44 in battery assembly 14 to further facilitate slidable engagement of battery assembly 14 within mounting assembly 12.

Having described the basic components of battery assembly 14, the handle assembly will now be described in further detail. Accordingly and with reference to FIGS. 6, 7, and 12-15, handle assembly 58 may include a handle 60 and lock flange 62, which may be a single structure having a central aperture 90 defined therethrough. Handle 60 and lock flange 62 may further include notches 92 which may correspond to grooves 44 and notches 74; however, as best seen in FIG. 7, lock flange 62 may include one less notch 92 than rows 28 of teeth 32. According to the example shown, where mounting assembly 12 includes three rows 28A, 28B, and 28C of teeth 32, lock flange 62 may include only two notches 92, shown as notches 92A and 92B. These two notches 92A and 92B may correspond to grooves 44A and 44B and longitudinal rows of teeth 28A and 28B while a top edge 94 of lock flange 62 may be sloped to permit clearance of the teeth 32 of longitudinal row of teeth 28C when handle 60 and lock flange 62 is operated, as discussed below. Handle 60 and lock flange 62 may be formed of any suitable material and may further include a pair of handle assembly spring mounts 98 which may extend through spring mount apertures 100 formed in the retainer plate 64.

Figure 13:
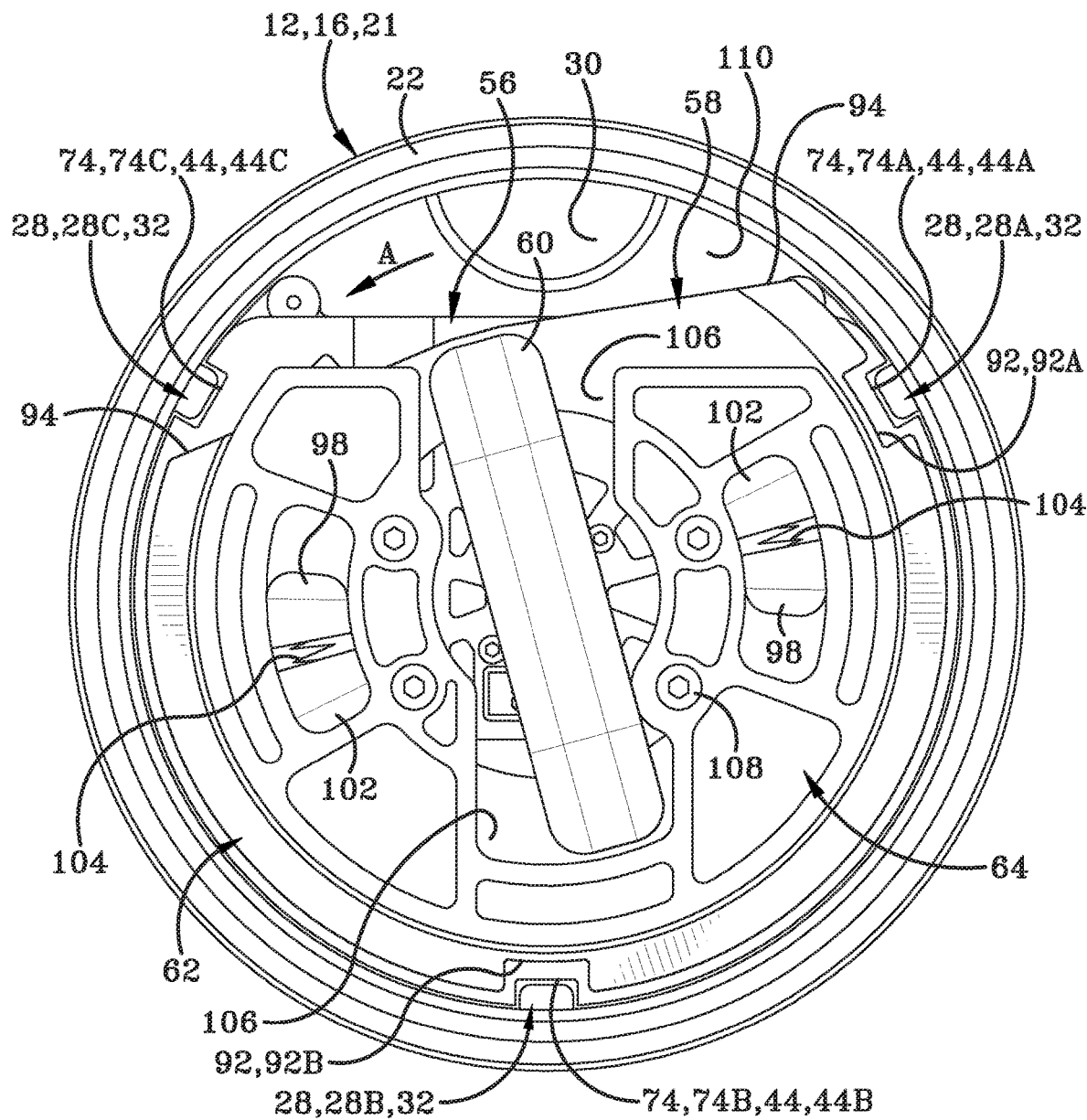
FIG. 13 is a front elevation operational view of a battery mounting mechanism with a handle assembly shown in an unlocked position according to one aspect of the present disclosure.
Figure 14:
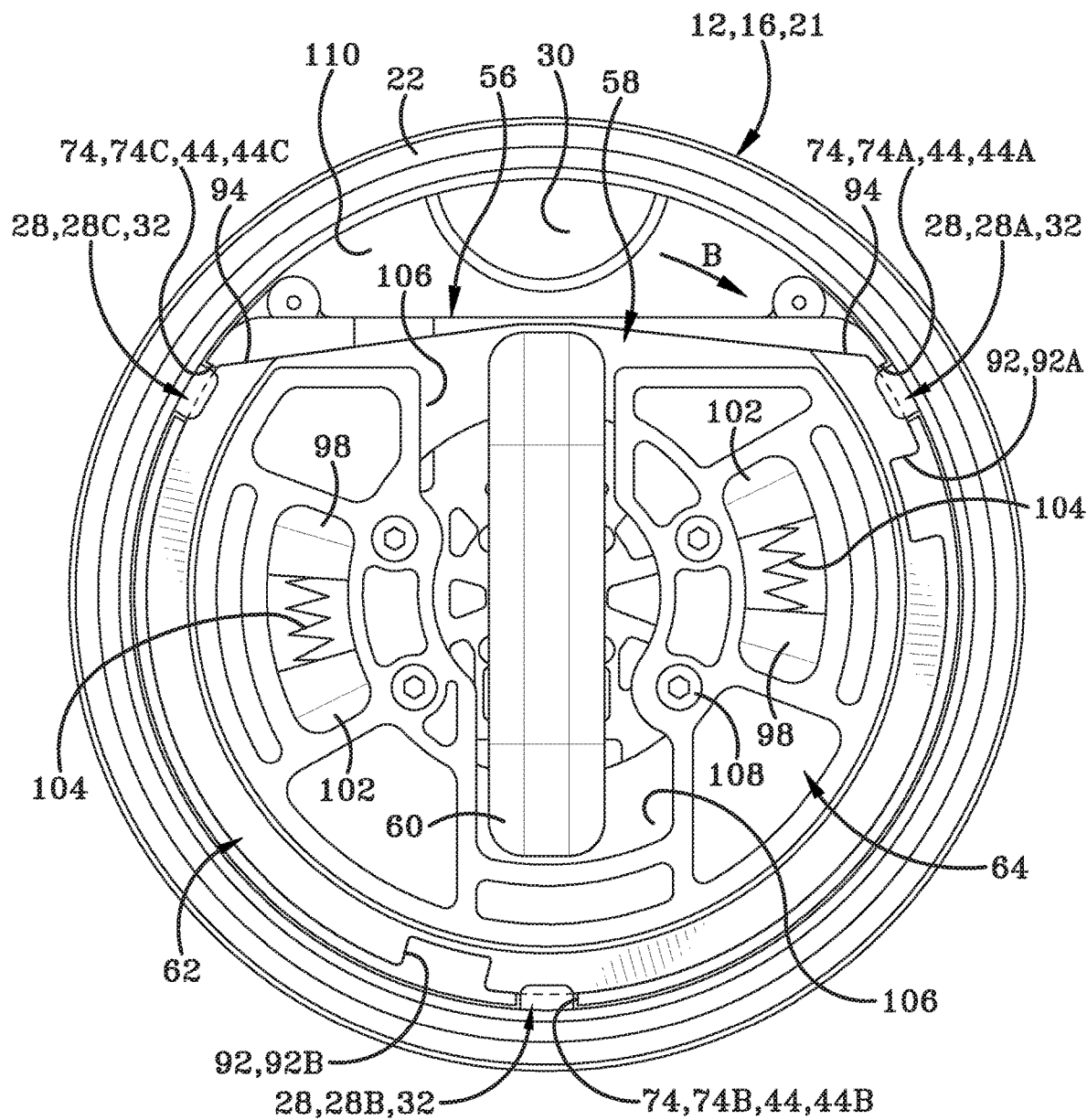
FIG. 14 is a front elevation operational view of a battery mounting mechanism with a handle assembly shown in a locked position according to one aspect of the present disclosure.
Figure 15:
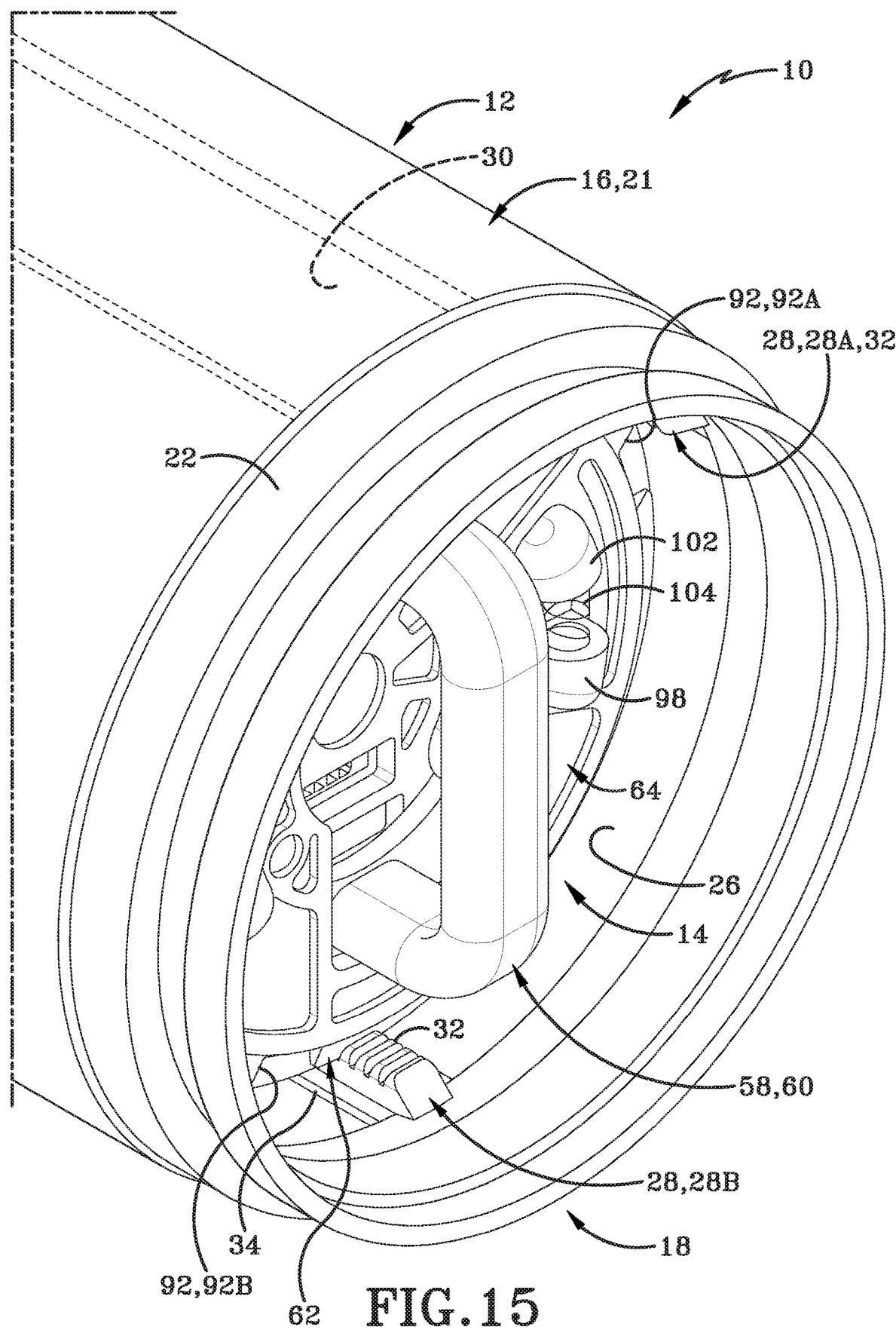
FIG. 15 is a front perspective operational view of a battery mounting mechanism according to one aspect of the present disclosure.

Retainer plate 64, in addition to spring mount apertures 100, may further include a pair of retainer plate spring mounts 102 which may correspond to the handle assembly spring mounts 98 to allow engagement with biasing springs 104 therebetween to bias the handle assembly 58 into a locked position, as discussed further below. Retainer plate 64 may further include handle cutout 106 which may allow rotational movement of handle 60 to unlock and lock handle assembly 58 and battery assembly 14 within two mounting assembly 12 as discussed further below. Finally, retainer plate may secure the handle assembly 58 to the PCB cover 56 through a series of screws 108 (omitted from most figures for clarity, but as can be seen in FIGS. 13 and 14) which may pass through apertures defined through retainer plate 64 and may threadably engage corresponding threaded apertures formed in PCB cover 56. The screws 108 may also pass through central aperture 90 of handle assembly 58 as to secure the handle assembly 58 retainer plate 64 and PCB cover 56 together while still permitting free rotational movement of handle assembly 58 relative to retainer plate 64 and PCB cover 56, as discussed further herein.

As mentioned with reference to the battery housing 38 and battery sections 36, the top end 96 of PCB cover 56, handle assembly 58, and retainer plate 64 may be cut off or reduced in size to facilitate the creation of space 110 which may permit electrical cabling or the like for battery assembly 14 to pass therethrough while within mounting assembly 12. Accordingly, as best seen in FIG. 5, when fully assembled, the entire battery assembly 14, including battery sections 36, PCBs 54, PCB cover 56, handle assembly 58, retainer plate 64, rear and front end plates 66 and 68, and snap rings 70 may be semi-circular with a flattened top 42, 96 to allow for the existence of space 110.

Having thus described the elements and components of battery mounting mechanism 10, the assembly thereof will now be described in further detail.

With reference to FIGS. 5-11, the formation of battery assembly 14 will be described in more detail. Specifically, for purposes of matching this disclosure to that as depicted in FIG. 5, a battery assembly having four battery sections 36A through 36D will be described; however, it will be again understood that any suitable number of battery sections 36 may be attached to or detached from battery assembly 14 as dictated by the desired implementation and the required battery output for that particular application. Accordingly, it will be further understood that the depicted and discussed example of battery assembly 14 with four battery sections 36A through 36D is a representative example and not a limiting example thereof.

According to this example, battery assembly 14 is therefore disclosed to include four battery sections 36, each of which may include a battery housing 38, a PCB 54 disposed at each of front and rear ends thereof, and a rear end plate 66 exterior of the PCB 54 on the rear end of each section 36. Each battery section 36 may further include the appropriate number and size of batteries 112 inserted within battery tubes 72. First battery section 36A may have a PCB cover 56, handle assembly 58, and retainer plate 64 disposed on the front end thereof. Second, third, and fourth battery sections 36B, 36C, and 36D each then include a front end plate 68 on the front end thereof. Thus, for each of second, third, and fourth battery sections 36B, 36C, and 36D, the components, as listed from front to back, include a front end plate 68, a PCB 54, a battery housing 38 containing batteries 112, a second PCB 54, and a rear end plate 66. First battery section 36A components, as listed from front to back, include retainer plate 64, handle assembly 58, PCB cover 56, a PCB 54, a battery housing 38 containing batteries 112, a second PCB 54, and a rear end plate 66.

Once each individual battery section 36A-36D are formed, they may be joined together at the longitudinal ends thereof. Specifically, the rear end of first section 36A may be joined to front end of section 36B. The rear of 36B may be joined to the front of 36C and so forth. To join adjacent battery sections 36 the rear end plate 66 of the battery section 36 may be engaged with the front end plate 68 of the next battery section 36. With reference to FIG. 11, an example of joining second section 36B (on the right) to third section 36C (on the left) is shown. In this example, the two adjoining sections 36B and 36C may be pushed together by aligning the flanges 78 of rear end plate 66 of section 36B with the recesses 76 in front end plate 68 of section 36C. Specifically, as seen in FIG. 11, recess 76A on front end plate 68 of section 36C may receive flange 78A from rear end plate 66 of section 36B while the recess 76A on rear end plate 66 of section 36B receives flange 78A from front end plate 68 of section 36C. Similar connections are made between recesses 76B, 76C, and 76D with flanges 78B, 78C, and 78D from both end plates 66 and 68 to form groove 84. Once so connected, a snap ring 70 may be slid up and into engagement with groove 84. This may removably secure second battery section 36B to third battery section 36. Other battery sections 36A, 36C, and 36D may be likewise attached to battery assembly 14 by connecting the rear end plate 66 of the forward battery section 36 to the front end plate 68 of the rearward battery section 36 and securing the two adjoining battery sections together via snap ring 70. In implementations where it is desirable to further secure battery sections 36A through 36D (or more) together, first and second projections 46 and 48 and arm 50 on the body 48 of battery housing 38 may define one or more screw apertures 52 which may be utilized to further affix the adjoining battery sections 36 together via the use of one or more bolts, screws, rivets, or the like (shown generally as screws 53). According to one example, where battery assembly 14 consists of numerous battery sections 36, thus imparting significant weight into battery assembly 14, it may be desirable to utilize these screw apertures 52 to securely attach adjoining battery sections 36 to help support the weight of battery assembly 14 as it is being moved into and out of engagement with mounting assembly 12 as discussed further below.

Once fully assembled, battery assembly 14 may be aligned with mounting assembly 12 such that grooves 44 may interact with the longitudinal rows of teeth 28 within the interior 26 of mounting assembly 12 and battery assembly 14 may be slid into and/or out of mounting assembly 12 as desired and discussed further below.

Having thus described the assembly of battery mounting mechanism 10, methods of use and operation therefor will now be discussed.

As discussed previously herein, battery mounting mechanism 10 is contemplated to be used in devices such as vehicles, including manned or unmanned land-based vehicles, aerial vehicles, or waterborne vehicles and watercraft. According to one aspect, battery mounting mechanism 10 may be utilized in the hull of an unmanned, underwater vehicle (UUV) which may be remote operated or may be autonomous. Accordingly, the size and placement of battery mounting mechanism 10 within a UUV may have measurable effect on the operation thereof. In particular, the distribution of weight both front to back (fore to aft) and side to side (port to starboard) can have a drastic effect on how the waterborne vessel operates in a body of water. Accordingly, the weight distribution needs to be adjusted to provide the proper ballasting of the vehicle. Similar effects are noticed when operating an airborne vehicle in that the weight distribution must be accounted for in the flight thereof.

With reference to FIGS. 12-15, battery mounting mechanism 10 may be mounted within a vehicle, which will be referred to herein for simplicity and clarity as a UUV, by first securing mounting assembly 12 into the desired position and then inserting a fully assembled battery assembly 14 within mounting assembly 12 such that grooves 44 in battery assembly 14 align with the longitudinal rows 28 of teeth 32 within the interior 26 of mounting assembly 12. Handle assembly 58 may then be rotated counter-clockwise in the direction of Arrow A in FIG. 13 to place the lock flange 62 into an unlocked position. The unlocked position is defined as the position wherein notches 92A and 92B of lock flange 62 are aligned with longitudinal rows 28A and 28B of teeth 32 and wherein the sloped top edge 94 of lock flange 62 is clear of the teeth 32 in longitudinal row 28C. In the unlocked position, the handle assembly spring mounts 98 may move towards the retainer plate spring mounts 102 thereby compressing biasing springs 104. In this unlocked position, battery assembly 14 may be freely slid longitudinally within the interior 26 of mounting assembly 12.

Once the battery assembly 14 is placed in the proper ballasting position, i.e. when the weight of battery assembly 14 is positioned to impart the desired ballasting effect on the UUV, handle 60 may be rotated clockwise in the direction of Arrow B in FIG. 14 to move the lock flange 62 into a locked position. Handle 60 may be manually rotated to lock the battery assembly 14 into place, or alternatively, handle 60 may simply be released and biasing springs 104 may bias the handle 60 to the locked position. This locked position is defined as the position wherein lock flange 62 may engage teeth 32 of the longitudinal rows 28A, 28B, and 28C may thereby secure battery assembly 14 in position longitudinally within mounting assembly 12. The inclusion of multiple rows 28 of teeth 32 and their interaction with grooves 44, may further prevent rotation of battery assembly 14 within mounting assembly 12 while the UUV is in operation.

If a different ballasting effect is desired, battery assembly 14 may be adjusted by reversing the previous steps, i.e. rotating the handle 60 into the unlock position and sliding battery assembly 14 to the new desired position before relocking the handle 60 and battery assembly 14 into the new position.

As the size of battery assembly 14, namely through the inclusion or removal of additional battery sections 36, increases or decreases, the proper ballasting position may change thus the present battery mounting mechanism 10 may be utilized to quickly and efficiently adjust the ballasting position of battery assembly 14 without the need to unscrew or disassemble any of the mounting aspects of the battery mounting mechanism 10.

Where it is contemplated that battery mounting mechanism 10 may be utilized multiple times with the same desired position or configuration, mounting assembly 12 may be marked or otherwise blocked to quickly provide that battery assembly 14 may be positioned in the identical spot. According to one example, battery assembly 14 may be moved to the proper ballasting position and mounting assembly 12 may be marked to show that position. According to another example, battery assembly 14 may be inserted into mounting assembly 12 and moved to the proper ballasting position, then battery assembly 14 may be removed and a physical barrier may be inserted into the mounting assembly 12 before replacing battery assembly 14 therein. The inclusion of a physical barrier may allow battery assembly 14 to be moved back to the exact position but not further, thus providing that battery assembly 14 may be repeatably positioned within mounting assembly 12 as desired.

The simplicity of movement of battery assembly 14 within mounting assembly 12, in conjunction with the rapid attachment and detachment of adjoining battery sections 36, provide advantages over current systems in that the present battery mounting mechanism 10 does not require modifications to be made to the hull of a UUV (or to other components the UUV or of other vehicles), thus weak hull sections are not created. Further, the prevention of rotation of battery assembly 14 prevents the weight of battery mounting mechanism 10 from shifting during operation of as associated vehicle. Finally, battery mounting mechanism 10 may be more quickly and easily moved, adjusted, installed, and/or uninstalled as well as maintained as compared to current battery mounting systems.

Although described herein for use with a UUV, it will be understood that the battery mounting mechanism 10 of the present disclosure may be equally applicable to any desired vehicle or device that utilizes battery power and where it is advantageous to prevent movement of the battery assembly within that vehicle or device. Further, the advantages in installation and removal of the presently disclosed battery assembly may further provide for ease of maintenance of both the battery system and the associated device. Finally, it will be understood that the battery mounting mechanism 10 of the present disclosure may be adapted or modified in size, weight, and/or for various power output requirements, according to the desired implementation. These modifications may include, but are not limited to, an increase or reduction in length, weight, shape, or volume without deviating from the scope of the disclosure herein.

As further described herein, battery assembly 14 is movable within mounting assembly 12. While these movements are described as manual adjustments to the battery assembly 14, it will be understood that any or all of these movements may be motorized or automated. For example, the adjustment of the position of battery assembly 14 within assembly 12 may be accomplished through the use of motorized components that may cause the battery assembly 14 to slide within assembly 12. These motorized components may further be utilized to rotate handle assembly 58 between the unlocked and locked positions. Further, it will be understood that these movements may be controlled automatically. According to one non-limiting example, where battery mounting mechanism 10 is installed in a watercraft, other systems may detect the need to adjust the ballast of the watercraft dynamically, and may prompt a motorized movement of battery assembly 14 to account for the needed adjustment. It will be understood that other systems necessary for such an operation may be included as dictated by the desired implementation.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A battery mounting mechanism comprising:
   a mounting assembly having at least one longitudinal row of teeth extending into an interior of the mounting assembly;
   at least one battery section having at least one groove corresponding to the at least one longitudinal row of teeth for slidable engagement therewith; and
   a handle assembly operable to engage at least one tooth in the at least one longitudinal row of teeth to lock the at least one battery section in position within the mounting assembly;
   wherein the handle assembly further comprises a lock flange that is rotatable between an unlocked position wherein at least one notch defined in the lock flange is aligned with the at least one longitudinal row of teeth and operable to permit the at least one battery assembly to move to a plurality of longitudinal positions within the mounting assembly, and a locked position wherein the lock flange is engaged with at least one tooth of the at least one longitudinal row of teeth to prevent longitudinal movement of the at least one battery section within the mounting assembly.

2. The battery mounting mechanism of claim 1 wherein the at least one longitudinal row of teeth prevents the at least one battery section from rotating within the mounting assembly.

3. The battery mounting mechanism of claim 1 further comprising:
   a first battery section having at least one groove corresponding to the at least one longitudinal row of teeth for slidable engagement therewith and an end plate on a rear end of the first battery section; and
   a second battery section having at least one groove corresponding to the at least one longitudinal row of teeth for slidable engagement therewith and an end plate on a front end of the second battery section.

4. The battery mounting mechanism of claim 3 wherein the end plate on the first battery section is an opposing mirror image of the end plate on the second battery section, each end plate further comprising:
   a plurality of recesses; and
   a plurality of flanges that are operable to fit within the plurality of recesses on the opposing end plate to form a continuous groove around at least a portion of the two end plates.

5. The battery mounting mechanism of claim 4 further comprising:
   a snap ring operable to engage the groove formed by the plurality of recesses and the plurality of flanges on the end plates of the first and second battery sections.

6. The battery mounting mechanism of claim 1 wherein the mounting assembly further comprises:
   at least three longitudinal rows of teeth extending into the interior of the mounting assembly.

7. The battery mounting mechanism of claim 6 wherein the at least one battery section further comprises:
   at least three grooves corresponding to the at least one longitudinal row of teeth for slidable engagement therewith; and wherein the handle assembly is operable to engage at least one tooth in the at least one longitudinal row of teeth from each of the at least three longitudinal rows of teeth to lock the at least one battery section in position within the mounting assembly.

8. The battery mounting mechanism of claim 1 further comprising:
   a longitudinal channel defined in the mounting assembly.

9. A battery mounting mechanism, comprising:
a mounting assembly having at least one longitudinal row of teeth extending into an interior of the mounting assembly;
at least one battery section having at least one groove corresponding to the at least one longitudinal row of teeth for slidable engagement therewith; and
a handle assembly operable to engage at least one tooth in the at least one longitudinal row of teeth to lock the at least one battery section in position within the mounting assembly;
a first battery section having at least one groove corresponding to the at least one longitudinal row of teeth for slidable engagement therewith and an end plate on a rear end of the first battery section; and
a second battery section having at least one groove corresponding to the at least one longitudinal row of teeth for slidable engagement therewith and an end plate on a front end of the second battery section.

10. The battery mounting mechanism of claim 9, wherein the at least one longitudinal row of teeth prevents the at least one battery section from rotating within the mounting assembly.

11. The battery mounting mechanism of claim 9, wherein the handle assembly further comprises:
a lock flange that is rotatable between an unlocked position wherein at least one notch defined in the lock flange is aligned with the at least one longitudinal row of teeth and operable to permit the at least one battery assembly to move to a plurality of longitudinal positions within the mounting assembly, and a locked position wherein the lock flange is engaged with at least one tooth of the at least one longitudinal row of teeth to prevent longitudinal movement of the at least one battery section within the mounting assembly.

12. The battery mounting mechanism of claim 9 wherein the end plate on the first battery section is an opposing mirror image of the end plate on the second battery section, each end plate further comprising:
a plurality of recesses; and
a plurality of flanges that are operable to fit within the plurality of recesses on the opposing end plate to form a continuous groove around at least a portion of the two end plates.

13. The battery mounting mechanism of claim 12 further comprising:
a snap ring operable to engage the groove formed by the plurality of recesses and plurality of flanges on the end plates of the first and second battery sections.

14. The battery mounting mechanism of claim 9 wherein the mounting assembly further comprises:
at least three longitudinal rows of teeth extending into the interior of the mounting assembly.

15. The battery mounting mechanism of claim 14 wherein the at least one battery section further comprises:
at least three grooves corresponding to the at least one longitudinal row of teeth for slidable engagement therewith; and wherein the handle assembly is operable to engage at least one tooth in the at least one longitudinal row of teeth from each of the at least three longitudinal rows of teeth to lock the at least one battery section in position within the mounting assembly.

16. The battery mounting mechanism of claim 9 further comprising:
a longitudinal channel defined in the mounting assembly.

* * * * *